United States Patent
Lee et al.

(10) Patent No.: US 7,414,680 B2
(45) Date of Patent: Aug. 19, 2008

(54) LIQUID CRYSTAL DISPLAY APPARATUS AND TABLET PERSONAL COMPUTER HAVING THE SAME

(75) Inventors: Sang-Duk Lee, Yongin-si (KR); Jung-Tae Kang, Suwon-si (KR)

(73) Assignee: Samsung Electronics, Co., Ltd., Kyungki-do (KR)

( * ) Notice: Subject to any disclaimer, the term of this patent is extended or adjusted under 35 U.S.C. 154(b) by 56 days.

(21) Appl. No.: 10/804,991

(22) Filed: Mar. 18, 2004

(65) Prior Publication Data

US 2004/0263699 A1 Dec. 30, 2004

(30) Foreign Application Priority Data

Jun. 25, 2003 (KR) .................. 10-2003-0041330

(51) Int. Cl.
*G02F 1/1333* (2006.01)
*G02F 1/1345* (2006.01)

(52) U.S. Cl. .......................... 349/58; 349/150

(58) Field of Classification Search .................. 349/62, 349/12, 16, 58–60, 149–152
See application file for complete search history.

(56) References Cited

U.S. PATENT DOCUMENTS

| | | | | |
|---|---|---|---|---|
| 6,046,785 A * | 4/2000 | Won | .............. | 349/58 |
| 6,339,457 B1 * | 1/2002 | Won | .............. | 349/58 |
| 6,473,146 B1 * | 10/2002 | Lee | .............. | 349/152 |
| 6,587,355 B2 * | 7/2003 | Park et al. | ............. | 361/799 |
| 6,891,582 B2 * | 5/2005 | Hwang | ........... | 349/58 |

FOREIGN PATENT DOCUMENTS

| | | |
|---|---|---|
| JP | 08-221003 | 8/1996 |
| JP | 09-043579 | 2/1997 |
| JP | 11-038430 | 2/1999 |
| JP | 2000-155306 | 6/2000 |

OTHER PUBLICATIONS

PCT International Search Report and PCT Written Opinion of the International Search Authority dated Sep. 1, 2004 corresponding to PCT/KR 2004/000638.

* cited by examiner

*Primary Examiner*—Dung T. Nguyen
(74) *Attorney, Agent, or Firm*—MacPherson Kwok Chen & Held LLP; Mark A. Pellegrini

(57) ABSTRACT

A liquid crystal display apparatus includes a liquid crystal display panel, a driver printed circuit board, a backlight assembly and a receiving container. The driver printed circuit board is electrically connected to the liquid crystal display panel to provide the liquid crystal display panel with the image date. The backlight assembly is disposed under the liquid crystal display panel. The receiving container has front side and back side. The front side supports the backlight assembly. First and second protrusion portions are formed on a backside to support the driver printed circuit board, such that the driver printed circuit board is spaced apart from the backside of the receiving container. Thus, a work for lifting up the data PCB to insert the digitizer into between the data PCB and the receiving container is not required, so that productivity is enhanced.

16 Claims, 9 Drawing Sheets

LIQUID CRYSTAL DISPLAY APPARATUS AND TABLET PERSONAL COMPUTER HAVING THE SAME

CROSS-REFERENCE TO RELATED APPLICATIONS

This application relies for priority upon Korean Patent Application No.2003-41330 filed on Jun. 25, 2003, the contents of which are herein incorporated by reference in its entirety.

BACKGROUND OF THE INVENTION

1. Field of the Invention

The present invention relates to a liquid crystal display apparatus and a tablet PC having the liquid crystal display apparatus, and more particularly to liquid crystal display apparatus for simplifying a manufacturing process to enhance productivity and a tablet PC having the liquid crystal display apparatus.

2. Description of the Related Art

Generally, a tablet is a device for a two-dimensional graphic work. A user may write characters and paint on a tablet pad of plate shape by using a pointing device.

A tablet personal computer (hereinafter, referred to as tablet PC) includes a function of the tablet.

Figure 1:
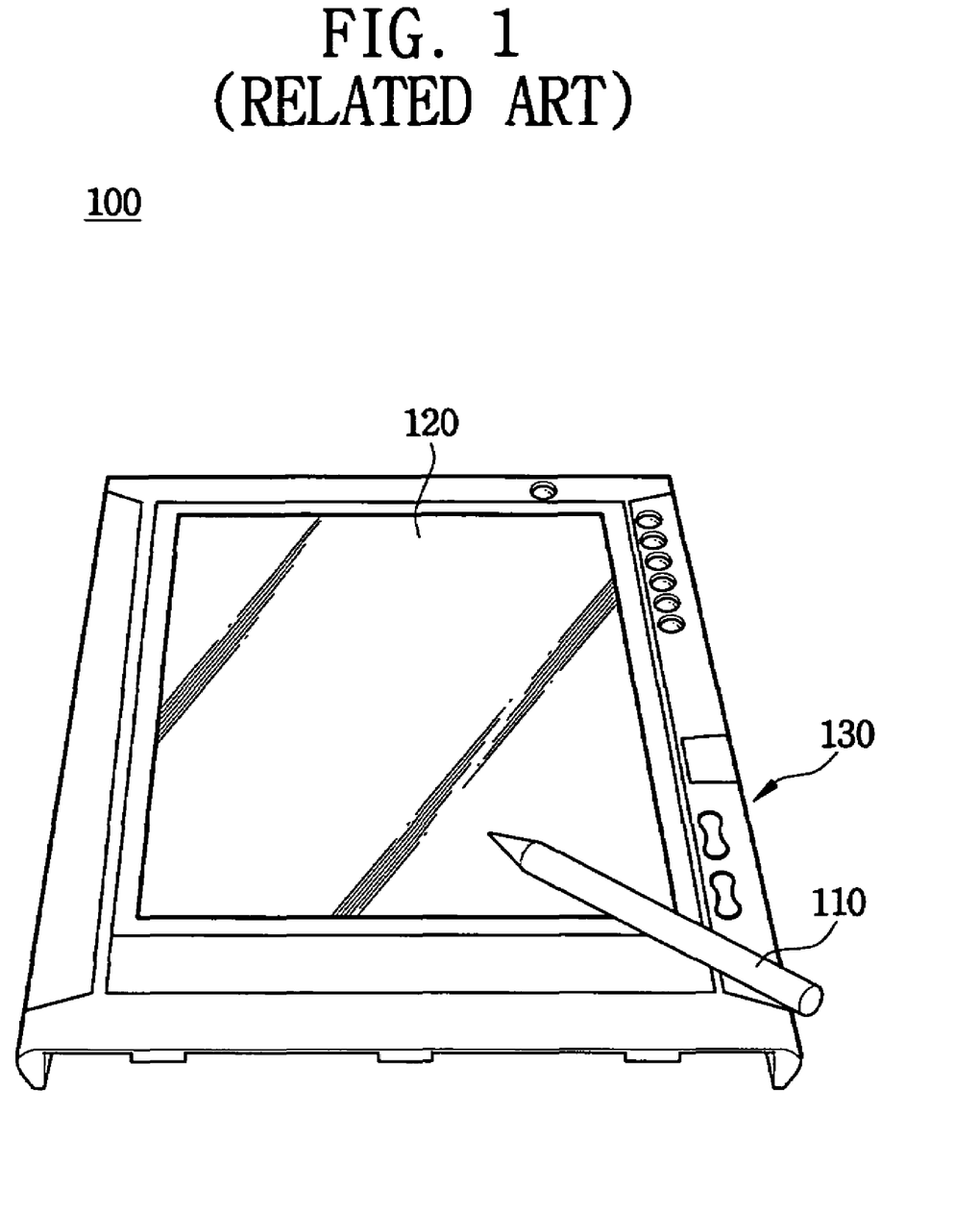
FIG. 1 is a perspective view showing a tablet PC.

FIG. 1 is a perspective view showing a tablet PC.

Referring to FIG. 1, the tablet PC 100 includes a pointing device 110, a liquid crystal display panel 120 and a PC body 130. A two-dimensional coordinate is inputted via the pointing device 110. An image is displayed via the liquid crystal display panel 120. The PC body 130 includes a digitizer (not shown). The digitizer transforms the two-dimensional coordinate into an electrical signal. A protection glass (not shown) is disposed on the liquid crystal display panel 120 to prevent the liquid crystal display panel 120 from being damaged by the pointing device 110.

Figure 2:
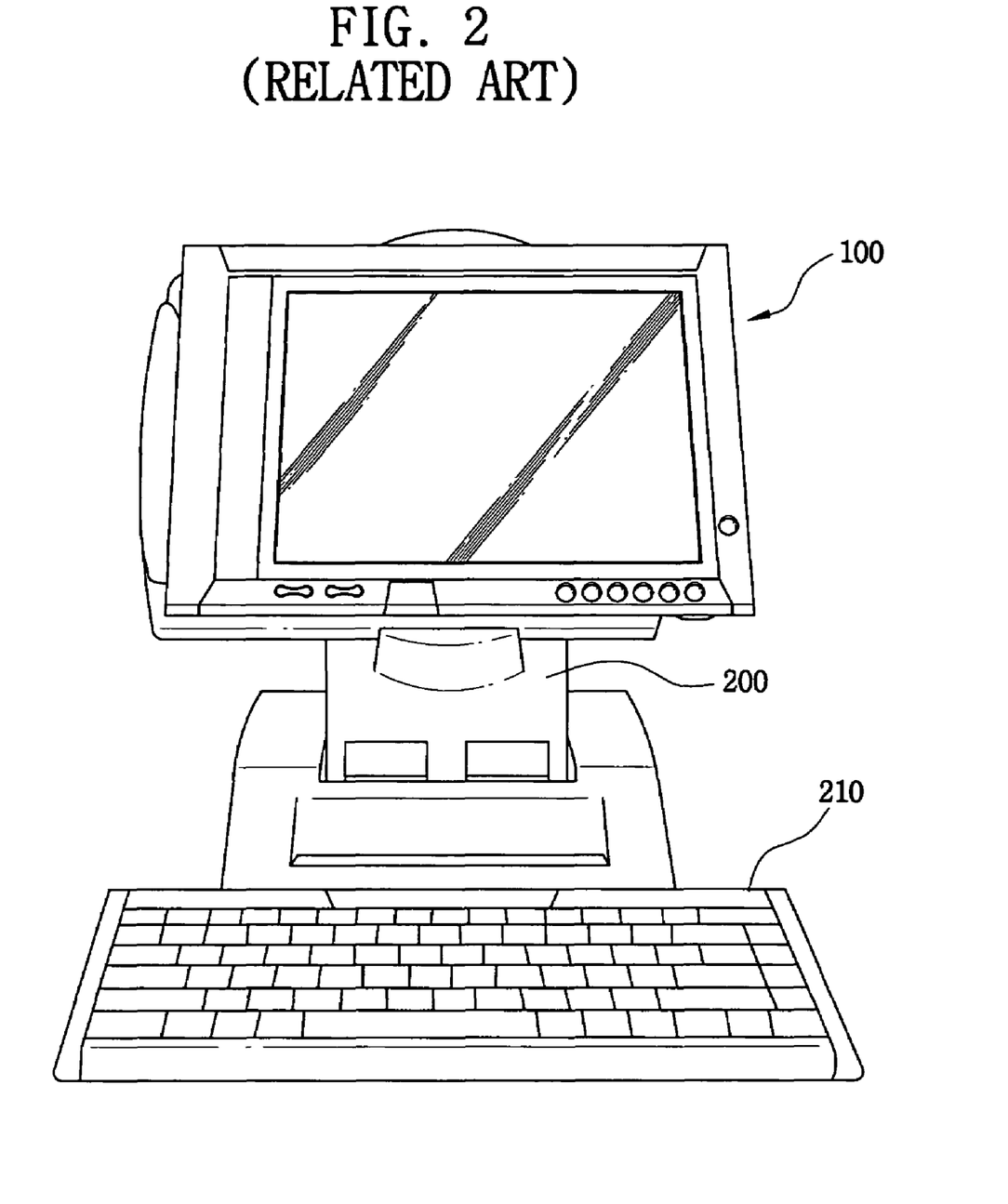
FIG. 2 is a perspective view showing a desktop PC including a tablet PC of FIG. 1.

FIG. 2 is a perspective view showing a desktop PC including a tablet PC of FIG. 1.

Referring to FIGS. 1 and 2, a tablet PC 100 may be combined with a docking stage 200, so that the tablet PC 100 is used as a desktop PC. A wireless or wired keyboard 210 may be connected to the tablet PC 100 and a pointing device 110, so that the tablet PC may receive signals from the keyboard 210 and the pointing device 110.

Figure 3:
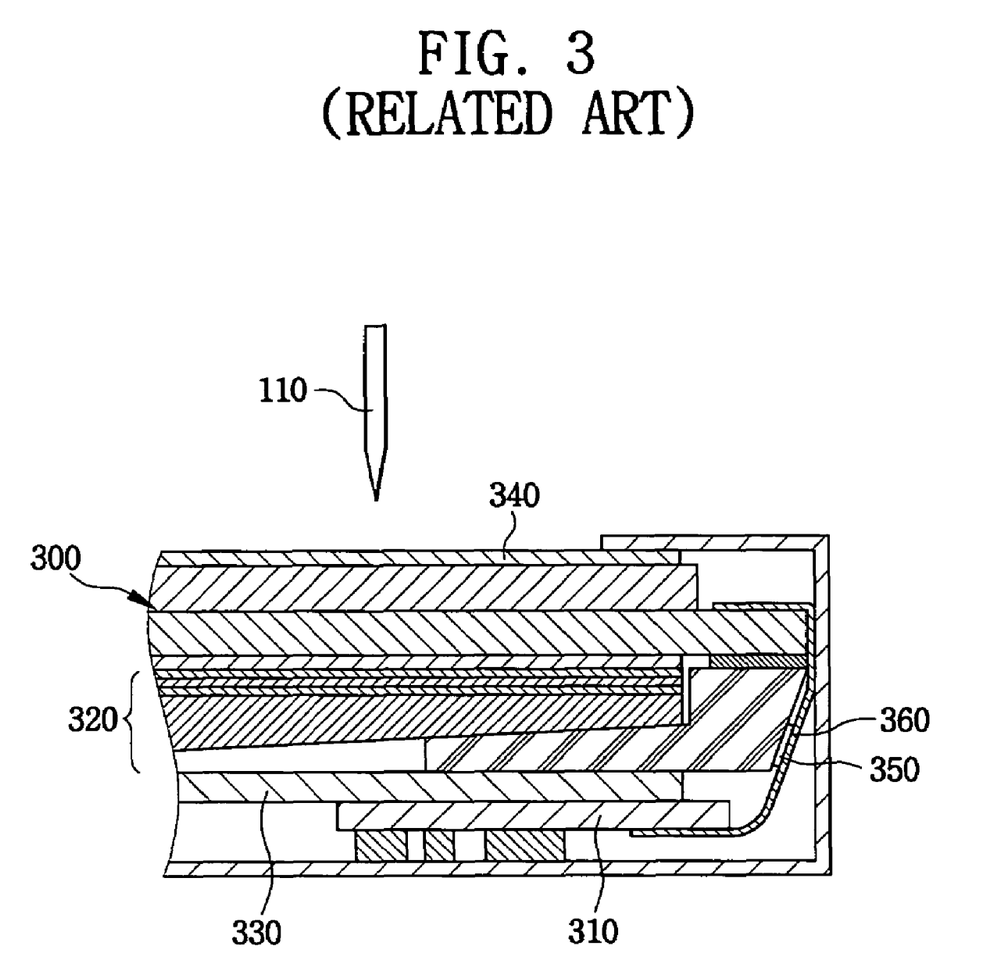
FIG. 3 is a cross-sectional view showing a general LCD module used for a tablet PC.

FIG. 3 is a cross-sectional view showing a general LCD module used for a tablet PC.

Referring to FIG. 3, a general liquid crystal display module (hereinafter, referred to as LCD module) includes a liquid crystal display panel 300, a data printed circuit board (hereinafter, referred to as data PCB) 310, a backlight assembly 320, a digitizer 330 and a protection glass 340. The liquid crystal display panel 300 displays an image. The data PCB provides the liquid crystal display panel 300 with image signals. The backlight assembly 320 provides the liquid crystal display panel 300 with a light. The digitizer 330 transforms coordinate information from the pointing device 110 into an electrical signal. The protection glass 340 prevents the liquid crystal display panel from being damaged by the pointing device 110.

The data PCB 310 is electrically connected to the liquid crystal display panel 300 via a tape carrier package (hereinafter, referred to as TCP) 360 having a data driver chip attached thereon. The TCP 360 is bent, so that the data PCB 310 is disposed on a backside of the backlight assembly 320.

The digitizer 330 in interposed between the data PCB 310 and the backlight assembly 320.

In the process of assembling the general LCD module, the general LCD module is disposed upside down. Then, the data PCB 310 is lifted up, and the digitizer 330 is inserted into between the data PCB 310 and the backlight assembly 320.

Thus, during the data PCB 310 is being lifted up, a channel terminal of the data driver chip 350 formed on the TCP 360 may be damaged and opened.

Further, a worker should pay attention to details of a process for assembling the general LCD module, so that a time spent for manufacturing the tablet PC increases. Thus, productivity is lowered.

SUMMARY OF THE INVENTION

Accordingly, the present invention is provided to substantially obviate one or more problems due to limitations and disadvantages of the related art.

In one aspect of the present invention, a liquid crystal display apparatus for enhancing productivity is provided.

In another aspect of the present invention, a tablet PC having the liquid crystal display apparatus is provided.

A liquid crystal display apparatus includes a liquid crystal display panel, a driver printed circuit board, a backlight assembly and a receiving container. The liquid crystal display panel receives an image data, and displays an image according to the image data. The driver printed circuit board is electrically connected to the liquid crystal display panel so as to provide the liquid crystal display panel with the image date. The backlight assembly is disposed under the liquid crystal display panel so as to provide the liquid crystal display panel with a light. The receiving container has front side and back side. The front side supports the backlight assembly. First and second protrusion portions are formed on the backside so as to support the driver printed circuit board, such that the driver printed circuit board is spaced apart from the backside of the receiving container.

The tablet personal computer includes a liquid crystal display panel, a driver printed circuit board, a backlight assembly, a receiving container a chassis and a digitizer. The liquid crystal display panel receives an image data, and displays an image according to the image data. The driver printed circuit board is electrically connected to the liquid crystal display panel so as to provide the liquid crystal display panel with the image data. The backlight assembly is disposed under the liquid crystal display panel so as to provide the liquid crystal display panel with a light. The receiving container has front side and back side. The front side supports the backlight assembly. First and second protrusion portions are formed on a backside so as to support the driver printed circuit board, such that the driver printed circuit board is spaced apart from the backside of the receiving container. The chassis receives the liquid crystal display panel and the backlight assembly. The digitizer provides the driver printed circuit board with signals corresponding to coordinate information. The digitizer is disposed between the driver printed circuit board and the receiving container.

Thus, a work for lifting up the data PCB so as to insert the digitizer into between the data PCB and the receiving container is not required, thereby enhancing productivity.

BRIEF DESCRIPTION OF THE DRAWINGS

The above and other features and advantage points of the present invention will become more apparent by describing in detail exemplary embodiments thereof with reference to the accompanying drawings, in which.

DESCRIPTION OF PREFERRED EMBODIMENTS

Hereinafter, the preferred embodiment of the present invention will be described in detail with reference to the accompanied drawings.

Embodiment 1

Figure 4:
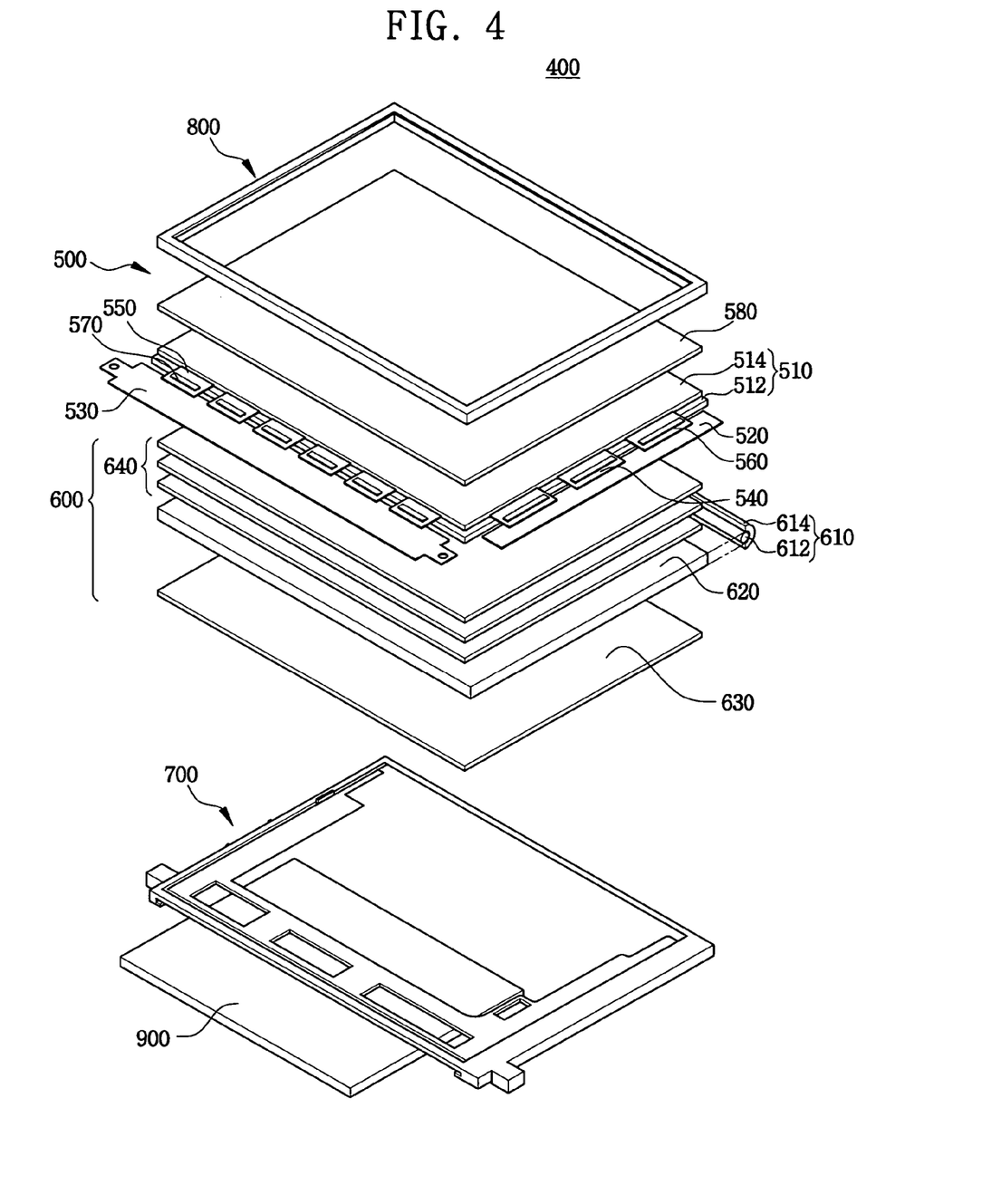
FIG. 4 is an exploded perspective view showing a liquid crystal display apparatus according to a first exemplary embodiment of the present invention.
Figure 5:
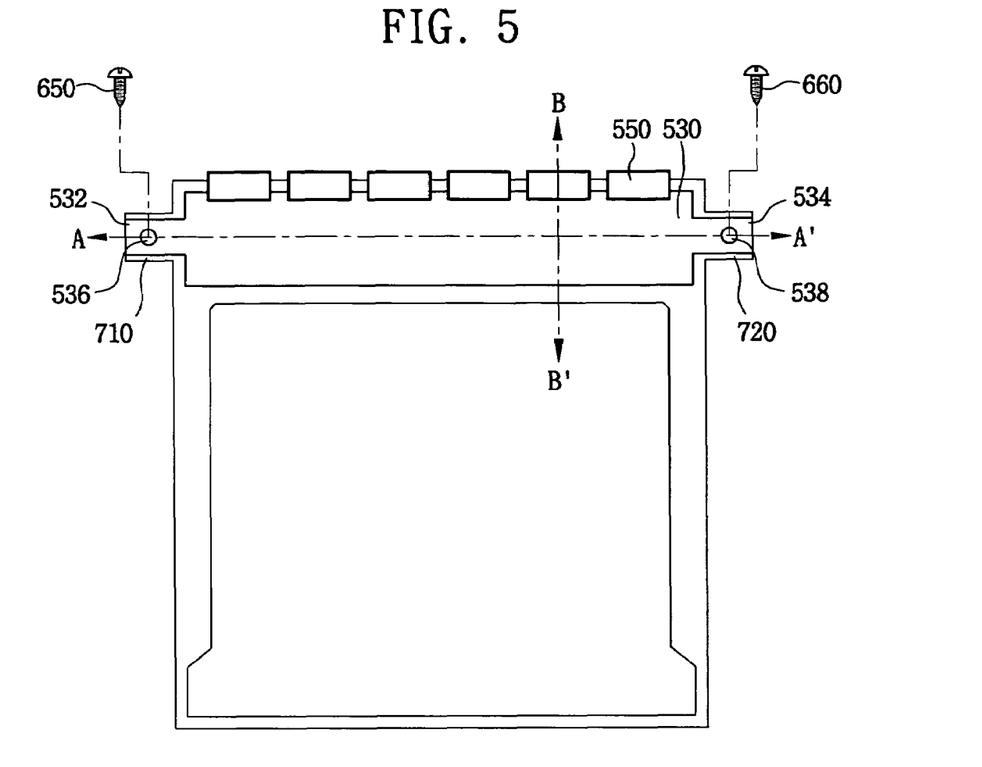
FIG. 5 is a plan view showing a backside of a backlight assembly of FIG. 4.
Figure 6:
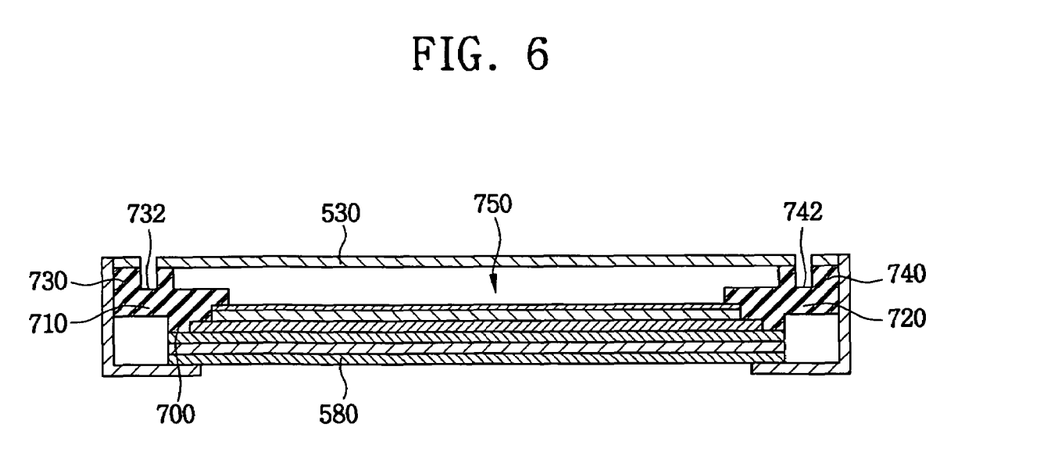
FIG. 6 is a cross-sectional view taken along the line A-A' of FIG. 5.
Figure 7:
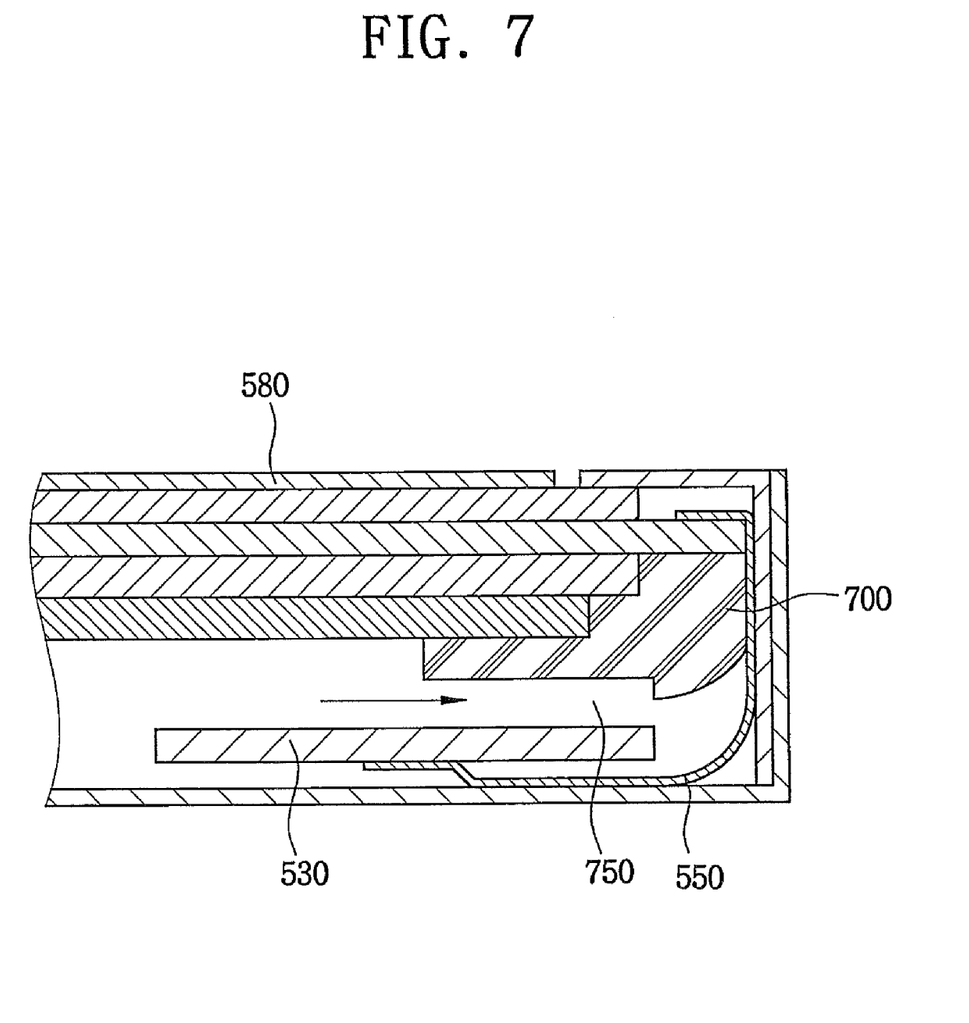
FIG. 7 is a cross-sectional view taken along a line B-B' of FIG. 5.

FIG. 4 is an exploded perspective view showing a liquid crystal display apparatus according to a first exemplary embodiment of the present invention, and FIG. 5 is a plan view showing a backside of a backlight assembly of FIG. 4. FIG. 6 is a cross-sectional view taken along the line A-A' of FIG. 5, and FIG. 7 is a cross-sectional view taken along a line B-B' of FIG. 5.

Referring to FIG. 4, a liquid crystal display apparatus 400 according to a first exemplary embodiment of the present invention includes a display assembly 500 and a backlight assembly 600. The display assembly 500 displays an image. The backlight assembly 600 provides the display assembly 500 with a light.

The display assembly 500 includes a liquid crystal display panel 510, a gate printed circuit board (hereinafter, referred to as gate PCB) 520, a data printed circuit board (hereinafter, referred to as data PCB) 530, a gate tape carrier package (hereinafter, referred to as gate TCP) 540 and a data tape carrier package (hereinafter, referred to as data TCP) 550. The liquid crystal display panel 510 displays an image. The gate PCB 520 provides the liquid crystal display panel 510 with driving signals. The data PCB 530 provides the liquid crystal display panel 510 with image data signals. The gate TCP 540 electrically connects the gate PCB 520 to the liquid crystal display panel 510. The data TCP 550 electrically connects the data PCB 530 to the liquid crystal display panel 510.

The liquid crystal display panel 510 includes a thin film transistor substrate (hereinafter, referred to as TFT substrate) 512, a color filter substrate 514 and a liquid crystal layer (not shown). The TFT substrate 512 includes a thin film transistor (not shown) and a pixel electrode (not shown). The color filter substrate 514 includes a color filter (not shown) and a common electrode (not shown). The color filter substrate 514 faces the TFT substrate 512. The liquid crystal layer is interposed between the TFT substrate 512 and the color filter substrate 514.

A plurality of data lines (not shown) and a plurality of gate lines (not shown) are formed on the TFT substrate 512. The data lines are extended in a first direction. The gate lines are extended in a second direction that is substantially perpendicular to the first direction. In addition, the TFT substrate 512 includes a plurality of pixel electrodes arranged in a matrix shape. The thin film transistor includes a gate electrode, a drain electrode and a source electrode. The gate electrode is electrically connected to one of the gate lines. The source electrode is electrically connected to one of the data lines. The drain electrode is electrically connected to one of the pixel electrodes.

The gate lines are electrically connected to the gate TCP 540 having a gate driver chip 560. The data lines are electrically connected to the data TCP 550 having a data driver chip 570.

The data TCP 550 is electrically connected to the data PCB 530, so that the data PCB applies an image data signal to the data lines via the data TCP 550 at the right time. The gate TCP 540 is electrically connected to the gate PCB 520, so that the gate PCB 520 applies a gate driving signal to the gate lines via the gate TCP 540.

A protection glass 580 is disposed on the liquid crystal display panel 510 to protect the liquid crystal display panel 510. The protection glass 580 prevents the liquid crystal display panel 510 from being damaged by an input pen (not shown).

The backlight assembly 600 includes a light generating section 610 and a light guide plate 620. The light generating section 610 generates a light. The light guide plate 620 guides the light generated from the light generating section 610 toward the liquid crystal display panel 510. The light generating section 610 includes a lamp 612 and a lamp reflector 614. The lamp reflector 614 covers the lamp 612 to reflect a light generated from the lamp 612 toward the light guide plate 620.

The back light assembly 600 further includes a reflection plate 630 and optical sheets 640. The reflection plate 630 is disposed under the light guide plate 620 to reflect a light that is leaked from the light guide plate 620 toward the light guide plate 620. The optical sheets 640 are disposed over the light guide plate 630 to uniformize a luminance of a light emitted from the light guide plate 620.

A mold frame (or receiving container) 700 receives the display assembly 500 and the backlight assembly 600.

The mold frame 700 receives the reflection plate 630, the light guide plate 620 and the optical sheets 640 in sequence. Then, the mold frame 700 receives the liquid crystal display panel 510, such that the liquid crystal display panel 510 is disposed over the optical sheets 640.

A chassis 800 is combined with the mold frame 700 to fix the display assembly 500 and the backlight assembly 600.

A digitizer 900 is disposed under the mold frame 700. The digitizer 900 transforms coordinate information from the input pen into an electrical signal. Then, the electrical signal is transferred to a tablet PC body (not shown). The tablet PC body receives the electrical signal corresponding to image data. The tablet PC provides the data PCB 530 with the electrical signal to apply the electrical signal to data lines.

The data TCP 550 is bent, such that the data PCB 530 of the display assembly 500 is disposed on a backside of the mold frame 700.

Referring to FIG. 5, the data PCB 530 includes first and second connection portions 532 and 534. The first and second connection portions 532 and 534 protrude from each end of the data PCB 530. The first and second connection portions 532 and 534 include first and second connection holes 536 and 538 respectively. First and second bolts 650 and 660 penetrate the first and second connection holes 536 and 538 respectively, and fix the data PCB 530 to the mold frame 700.

The mold frame 700 includes third and fourth connection portions 710 and 720. The third and fourth connection portions 710 and 720 correspond to the first and second connection portions 532 and 534 respectively.

Referring to FIGS. 6 and 7, the mold frame 700 includes the third and fourth connection portions 710 and 720. The third connection portion 710 protrudes from a first end portion of the mold frame 700, such that the third connection portion 710 corresponds to the first connection portion 532. The fourth connection portion 720 protrudes from a second end portion of the mold frame 700, such that the fourth connection portion 720 corresponds to the second connection portion 534.

The third connection portion 710 includes a first protrusion 730 that protrudes upwardly from the third connection portion 710. The fourth connection portion 720 includes a second protrusion 740 that protrudes upwardly from the fourth connection portion 720. The first protrusion 730 is substantially same as the second protrusion 740 in height.

The first protrusion 730 includes a first connection groove 732 that corresponds to the first connection hole 536 of the data PCB 530. The second protrusion 740 includes a second connection groove 742 that corresponds to the second connection hole 538 of the data PCB 530.

The data PCB 530 and the mold frame 700 may be combined together by Front Mount method. That is, the first and second bolts 650 and 660 pass through the first and second connection holes 536 and 538 of the data PCB 530, and inserted into the first and second connection grooves 732 and 734 of the mold frame 700, so that the data PCB 530 is fixed at a backside of the mold frame 700.

Then, an insertion space 750 is formed between the data PCB 530 and the mold frame 700 due to the first and second protrusions 730 and 740. The digitizer 900 of FIG. 4 is inserted into the insertion space 750.

Figure 8:
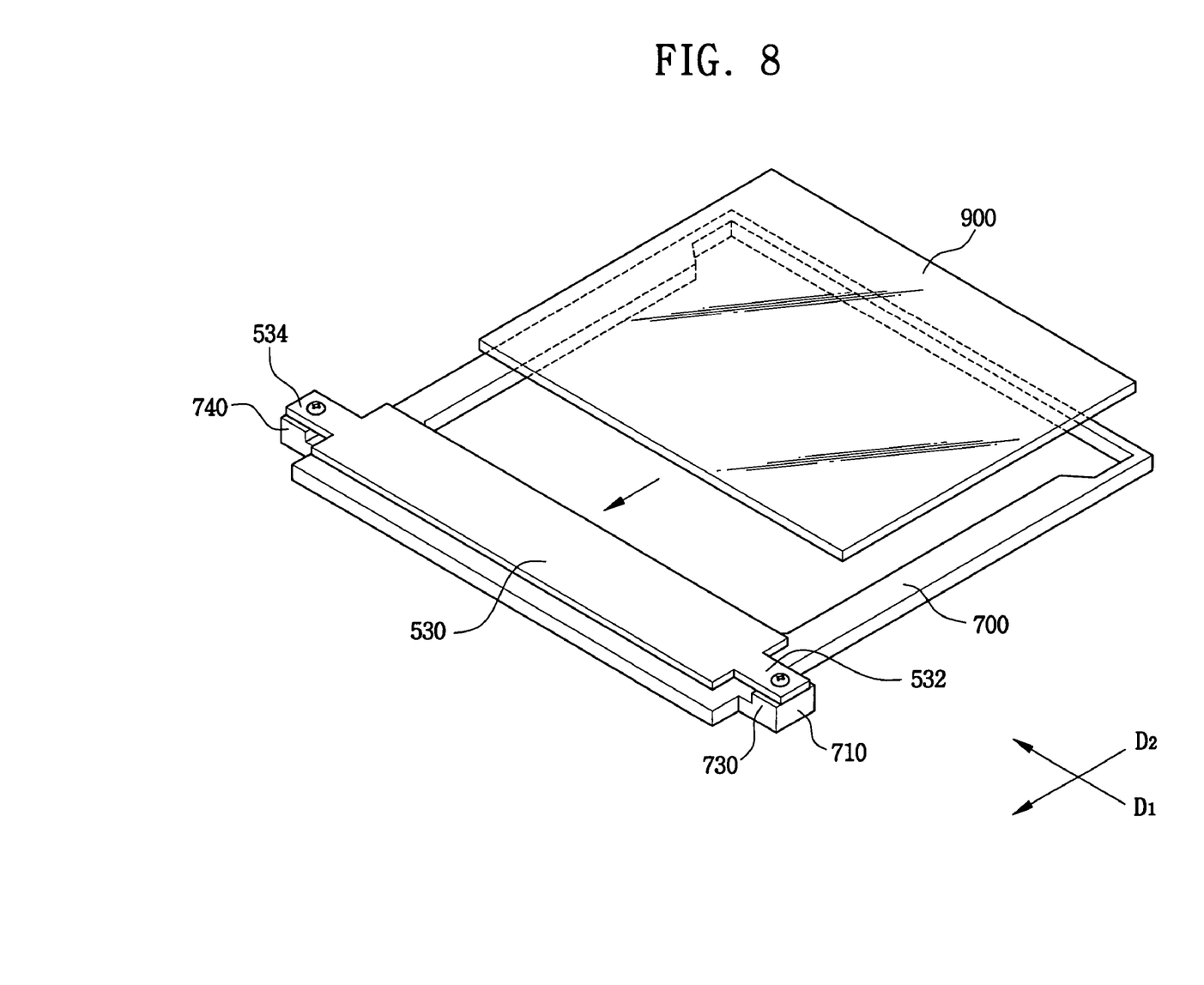
FIG. 8 is a perspective view showing an insertion of a digitizer into a mold frame and a data PCB.

FIG. 8 is a perspective view showing an insertion of a digitizer into a mold frame and a data PCB.

Referring to FIGS. 4 and 8, a digitizer 900 is inserted into an insertion space formed between the data PCB 530 and the mold frame 700 in a second direction D2, so that the digitizer 900 is interposed between the data PCB 530 and the mold frame 700.

Thus, a worker does not need to lift up the data PCB 530 to insert the digitizer 900, when assembling an LCD module. As a result, channel terminals of a data driver chip 570 formed on the data TCP 550 are not opened.

According to the present embodiment, a width Wd2 of the digitizer 900 is substantially same as a width Wd1 of the liquid crystal display apparatus 400. That is, the digitizer 900 and the liquid crystal display apparatus 400 have a substantially same width in a first direction D1 that is substantially perpendicular to the second direction D2.

Thus, first and second connection portions 532 and 534 of the data PCB 530, and third and fourth connection portions 710 and 720 of the mold frame 700 are formed. The first and third connection portions 532 and 710 protrude from one side, and the second and fourth connection portions 534 and 720 protrude from the other side, so that the insertion space for receiving the digitizer 900 having same width as the liquid crystal display apparatus 400 is formed.

Embodiment 2

Figure 9:
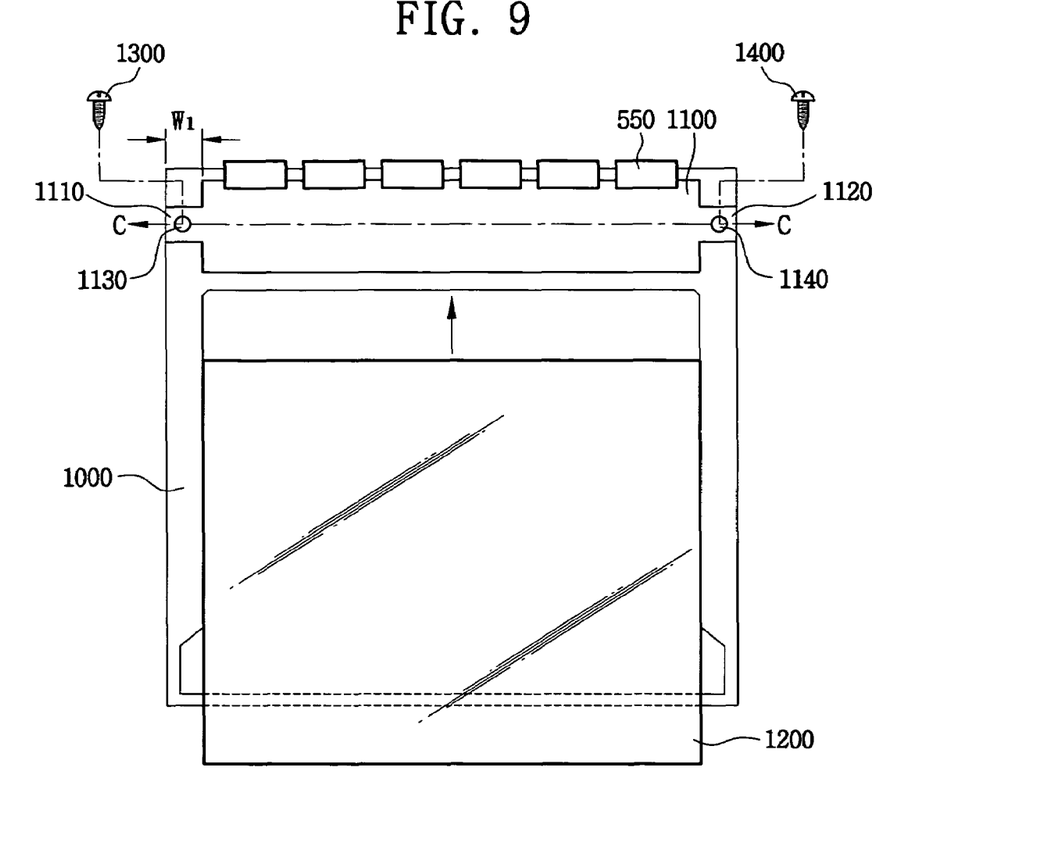
FIG. 9 is a plain view showing a backside of a backlight assembly of a liquid crystal display apparatus according to a second exemplary embodiment of the present invention.
Figure 10:
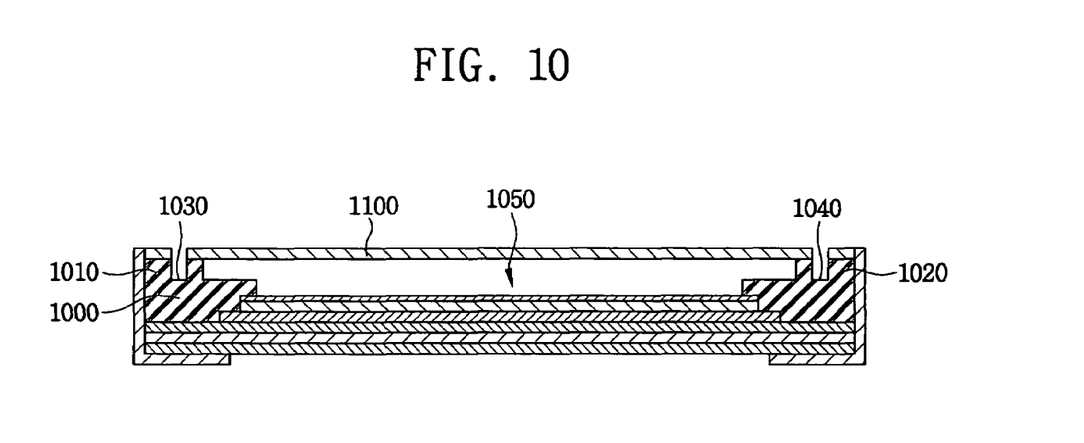
FIG. 10 is a cross-sectional view taken along the line C-C' of FIG. 9.

FIG. 9 is a plain view showing a backside of a backlight assembly of a liquid crystal display apparatus according to a second exemplary embodiment of the present invention, and FIG. 10 is a cross-sectional view taken along the line C-C' of FIG. 9. The liquid crystal display apparatus is same as in Embodiment 1 except for a backlight assembly. Thus, the same reference numerals will be used to refer to the same or like parts as those described in Embodiment 1 and any further explanation will be omitted.

Referring to FIG. 9, a liquid crystal display device according to a second exemplary embodiment of the present invention includes a data PCB 1100 disposed under a backside of a mold frame 1000. A data TCP 550 is bent, so that the data PCB 1100 is disposed under the mold frame 1000. A width Wd2 of the data PCB 1100 and the digitizer 1200 is shorter than a width Wd1 of the mold frame 1000. The digitizer 1200 is inserted between the data PCB 1100 and the mold frame 1000.

The data PCB 1100 includes first and second connection portions 1110 and 1120 protruded from both ends of the data PCB 1100 respectively. The first and second connection portions 1110 and 1120 include first and second connection holes 1130 and 1140 to which first and second bolts 1300 and 1400 penetrate, respectively.

Additionally, the data PCB 1100 is combined with the mold frame 1000.

Referring to FIG. 10, the mold frame 1000 includes first and second protrusions 1010 and 1020. The first and second protrusions 1010 and 1020 correspond to the first and second connection portions 1110 and 1120 of the data PCB 1100 respectively. The first and second protrusions 1010 and 1020 include first and second connection grooves 1030 and 1040 respectively. The first and second connection grooves 1030 and 1040 correspond to the first and second connection holes 1130 and 1140 respectively.

The data PCB 1100 and the mold frame 1000 may be combined together by Front Mount method. That is, the first and second bolts 1300 and 1400 pass through the first and second connection holes 1130 and 1140 of the data PCB 1100, and are inserted into the first and second connection grooves 1030 and 1040 of the mold frame 1000, so that the data PCB 1100 is fixed at a backside of the mold frame 1000.

Then, an insertion space 1050 is formed between the data PCB 1100 and the mold frame 1000 due to the first and second protrusions 1010 and 1020.

A width of the insertion space 1050 is shorter than the width Wd1 of the mold frame 1000. That is, when widths W1 of the first and second connection portions 1110 and 1120 are subtracted from the width Wd1 of the insertion space 1050, the width of the insertion space 1050 is obtained.

Figure 11:
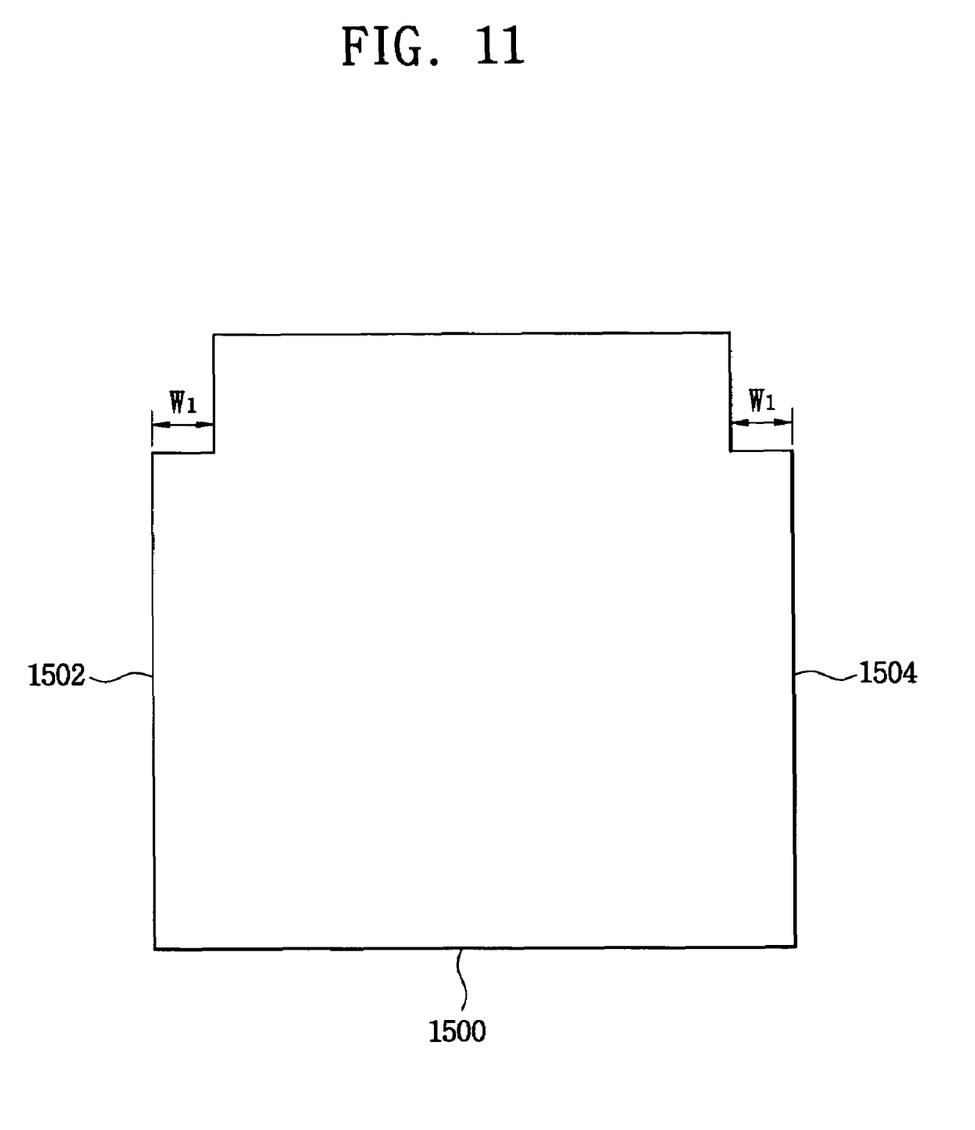
FIG. 11 is a plan view showing another digitizer being inserted into an insertion space of FIG. 9.

FIG. 11 is a plan view showing another digitizer being inserted into an insertion space of FIG. 9.

Referring to FIGS. 10 and 11, a digitizer 1500 is chamfered. That is, corners that correspond to the first and second protrusions 1010 and 1020 are cut out. In detail, the corners are cut out as much as a depth W1 of the first and second edges 1502 and 1504 respectively, such that the digitizer 1500 may be inserted into the insertion space 1050.

Hereinbefore, a liquid crystal display apparatus having the data driver chip 570 formed on the data TCP 550 is explained.

Further, the structure of the liquid crystal display apparatus according to the present invention is applied to a touch screen type tablet PC having a tablet panel that receives position coordinates from an input pen and transfers the position coordinates to a digitizer.

As described above, an insertion space for receiving the digitizer is formed between the data PCB that is disposed under the mold frame and mold frame. That is, the first and second connection portions protruding at each end of the mold frame and having the first and second protrusions respectively, so that the insertion space is formed.

Then, the digitizer is inserted into the insertion space. Thus, a work for lifting up the data PCB to insert the digitizer into between the data PCB and mold frame is not required.

As a result, terminals of the data driver chip formed on the TCP are not opened, which frequently occurs when the data PCB is lifted up. Further, productivity is enhanced because of simplicity of work.

Having described the exemplary embodiments of the present invention and its advantages, it is noted that various changes, substitutions and alterations can be made herein without departing from the spirit and scope of the invention as defined by appended claims.

What is claimed is:

1. A liquid crystal display apparatus comprising:
    a liquid crystal display panel that receives image data and displays an image according to the image data;
    a data printed circuit board that is electrically connected to the liquid crystal display panel to provide the liquid crystal display panel with the image data;
    a backlight assembly disposed under the liquid crystal display panel to provide the liquid crystal display panel with a light;
    a digitizer; and
    a receiving container having a front side and a back side, the front side supporting the backlight assembly, first and second protrusion portions being formed on the back side to support the data printed circuit board, such that the data printed circuit board is spaced apart from the back side of the receiving container to form an insertion space that extends from the first protrusion portion to the second protrusion portion, the insertion space being configured to facilitate insertion of the digitizer between the data printed circuit board and the receiving container.

2. The liquid crystal display apparatus of claim 1, wherein the receiving container includes first and second connection portions protruding from end portions of the receiving container, such that a width of the end portion of the receiving container is larger than a width of the receiving container, the first and second protrusion portions protrude from the first and second connection portions respectively, and the first and second protrusion portions include first and second connection holes respectively.

3. The liquid crystal display apparatus of claim 2, wherein the data printed circuit board includes third and fourth connection portions corresponding to the first and second connection portions of the receiving container, the third and fourth connection portions have third and fourth connection holes respectively, and the third and fourth connection holes correspond to the first and second connection holes respectively.

4. The liquid crystal apparatus of claim 3, wherein a first bolt penetrates the first and third connection holes and a second bolt penetrates the second and fourth connection holes, so that the data printed circuit board and the receiving container are combined together, such that the data printed circuit board and the receiving container are spaced apart from each other.

5. The liquid crystal display apparatus of claim 1, wherein the first and second protrusion portions are disposed on the edge portion of the receiving container, and the first and second protrusion portions have first and second connection holes.

6. The liquid crystal display apparatus of claim 5, wherein the data printed circuit board includes third and fourth connection holes corresponding to the first and second connection holes, respectively.

7. The liquid crystal display apparatus of claim 6, wherein a first bolt penetrates the first and third connection holes and a second bolt penetrates the second and fourth connection holes to combine the data printed circuit board and the receiving container, such that the data printed circuit board and the receiving container are spaced apart from each other.

8. The liquid crystal display apparatus of claim 1, wherein the digitizer is chamfered to be disposed between the data printed circuit board and the receiving container.

9. A tablet personal computer comprising:
    a liquid crystal display panel that receives image data and displays an image according to the image data;
    a data printed circuit board that is electrically connected to the liquid crystal display panel to provide the liquid crystal display panel with the image data;
    a backlight assembly disposed under the liquid crystal display panel to provide the liquid crystal display panel with a light;
    a digitizer;
    a receiving container having a front side and a back side, the front side supporting the bacldight assembly, first and second protrusion portions being formed on a back side to support the data printed circuit board, such that the data printed circuit board is spaced apart from the back side of the receiving container to form an insertion space that extends from the first protrusion portion to the second protrusion portion, the insertion space being configured to facilitate insertion of the digitizer between the data printed circuit board and the receiving container;
    a chassis that receives the liquid crystal display panel and backlight assembly; and
    wherein the digitizer provides the data printed circuit board with signals corresponding to coordinate information.

10. The tablet personal computer of claim 9, wherein the receiving container includes fiist and second connection portions protruding from end portions of the receiving container, such that a width of the end portion of the receiving container is larger than a width of the receiving container, the first and second protusion portions protrude from the first and second connection portions respectively, and the first and second protrusion portions includes first and second connection holes, respectively.

11. The tablet personal computer of claim 10, wherein the data printed circuit board includes third and fourth connection portions corresponding to the first and second connection portion of the receiving container, the third and fourth connection portions have third and fourth connection holes respectively, and the third and fourth connection holes correspond to the first and second connection holes respectively.

12. The tablet personal computer of claim 11, wherein first bolt penetrates the first and third connection holes and second bolt penetrates the second and fourth connection holes, so that the data printed circuit board and receiving container are combined together, such that the data printed circuit board and the receiving container are spaced apart from each other.

13. The tablet personal computer of claim 9, wherein the first and second protrusion portions are disposed on the edge portion of the receiving container, and the first and second protrusion portions have first and second connection holes.

14. The tablet personal computer of claim 13, wherein the data printed circuit board includes third and fourth connection holes corresponding to the first and second connection holes respectively.

15. The tablet personal computer of claim 14, wherein a first bolt penetrates the first and third connection holes and a second bolt penetrates the second and fourth connection holes to combine the data printed circuit board and the receiving container, such that the printed circuit board and the receiving container are spaced apart from each other.

16. The tablet personal computer of claim 15, wherein the digitizer is chamfered to be disposed between the data printed circuit board and the receiving container.

* * * * *